United States Patent
Döhmen et al.

(10) Patent No.: US 6,514,068 B2
(45) Date of Patent: Feb. 4, 2003

(54) MOLD FOR SUCTION/BLOWING SYSTEM

(75) Inventors: Willi Döhmen, Mönchengladbach (DE); Frank Schüller, Frechen (DE); Dirk Wehrens, St. Augustin (DE)

(73) Assignee: Sig Blowtec GmbH & Co. KG, Bonn (DE)

( * ) Notice: Subject to any disclaimer, the term of this patent is extended or adjusted under 35 U.S.C. 154(b) by 0 days.

(21) Appl. No.: 09/971,781

(22) Filed: Oct. 5, 2001

(65) Prior Publication Data

US 2002/0041913 A1 Apr. 11, 2002

(30) Foreign Application Priority Data

Oct. 6, 2000 (DE) .......................... 100 49 446

(51) Int. Cl.⁷ .......................... B29C 49/04; B29C 49/42
(52) U.S. Cl. .................... 425/532; 264/540; 264/542
(58) Field of Search ................ 264/542, 541, 264/540; 425/532

(56) References Cited

U.S. PATENT DOCUMENTS

| 4,645,447 A | * | 2/1987 | Sumitomo | 249/161 |
| 4,696,636 A | * | 9/1987 | Evely | 264/520 |
| 4,865,799 A | * | 9/1989 | Sadr | 264/500 |
| 4,878,828 A | | 11/1989 | Wollschlager | 425/541 |
| 5,700,498 A | * | 12/1997 | Renzo et al. | 264/523 |
| 5,932,166 A | * | 8/1999 | Bousselin et al. | 264/534 |
| 6,176,699 B1 | * | 1/2001 | Franjo et al. | 264/542 |

FOREIGN PATENT DOCUMENTS

| DE | 198 45 269 | 4/2000 | |
| EP | 1040904 A2 | * 10/2000 | B29C/49/42 |

OTHER PUBLICATIONS

"Nahtloses 3D–Blasformen Von Hohlkorpern" A.S.Krusche; Plastverarbeiter vol.44, No.12,1993, pp. 46–49.

* cited by examiner

Primary Examiner—Robert Davis
(74) Attorney, Agent, or Firm—Herbert Dubno; Andrew Wilford

(57) ABSTRACT

A molding apparatus has a pair of mold halves having faces engageable together to form a nonstraight passage having an intake end and an output end, extruder means for forming a hollow plastic preform and feeding it to the intake end of the passage, pump means connected to the output end of the passage for drawing gas therefrom and thereby applying drawing the preform through the passage, and a seal carried on one of the faces, extending along the passage, and engaging the other of the faces for preventing gas flow between the faces into the passage when the mold halves are closed together.

7 Claims, 2 Drawing Sheets

MOLD FOR SUCTION/BLOWING SYSTEM

FIELD OF THE INVENTION

The present invention relates to a suction/blowing mold system. More particularly this invention concerns the mold for such a system.

BACKGROUND OF THE INVENTION

In a standard suction/blowing mold system for producing complex three-dimensional hollow articles, typically of plastic, a hollow parison or preform having a closed leading end is Reproduced by an extruding apparatus. This leading end is engaged in an upper intake end of a mold passage formed between two fitted-together female mold halves and of somewhat greater cross-sectional size than the preform. Suction is applied to the opposite lower or output end of the mold passage to draw the preform while it is still warm and soft down through the mold as it is either emitted by the extruding apparatus or advanced by a manipulator.

Once the preform is threaded completely through the mold cavity, its leading and trailing ends are pinched closed at the upper and lower passage ends. A needle is then inserted centrally into the preform and gas is blown into it to expand it to fill the mold cavity. Once the material of the preform has cured, the mold is opened and the finished workpiece is removed. It will have the exact shape of the mold passage with no flashing or sprues. In particular its inner surface will be perfectly smooth and without seams. Such a system, as described in "Plast-verabeiter" (vol. 44, no. 12, 1993, pages 46–49) or in "Tech-nische Mitteilungen Krupp" (2/1998/ pages 49/50), is used, for go instance, to make complexly shaped manifold or feed tubes for appliances.

U.S. Pat. No. 4,878,828 of Wollschlager describes a mold-closing device which is intended to hold closed such a mold against the modest outwardly directed forces that tend to spread the die halves during inflation of the parison. This equipment is much simpler and less expensive than the complex mold closing and clamping systems used with higher-pressure molding operations.

German 198 45 269 of Koetke describes a system where the parison is fed through a short tubular fitting to the inlet end of the mold passage and warm air is sucked through the passage so as to draw in the parison and feed it even through a relatively complexly shaped passage. The air flow around the parison pulls it along while keeping it largely out of contact with the inner surfaces of the passage, making it possible to mold very complex shapes. The considerable suction here is a problem in some instances as lateral leaks can cause local air currents that damage the parison, for instance by cooling a portion of it so that it later cannot be deformed to the desired shape.

OBJECTS OF THE INVENTION

It is therefore an object of the present invention to provide an improved suction/blowing mold.

Another object is the provision of such an improved suction/blowing mold which overcomes the above-given disadvantages, that is which allows even very complexly shaped and small-diameter objects to be made in a fairly simple manner.

SUMMARY OF THE INVENTION

A molding apparatus has according to the invention a pair of mold halves having faces engageable together to form a nonstraight passage having an intake end and an output end, extruder means for forming a hollow plastic preform and feeding it to the intake end of the passage, pump means connected to the output end of the passage for drawing gas therefrom and thereby applying drawing the preform through the passage, and a seal carried on one of the faces, extending along the passage, and engaging the other of the faces for preventing gas flow between the faces into the passage when the mold halves are closed together.

Thus with this system no air will be sucked into the passage between the mold halves which, as described above, are not held together with substantial force. This is particularly useful in a suction/blowing molding system where the passage is often of fairly complex shape, so that ensuring that the two mold halves seat sealingly against each other is quite difficult.

The system of this invention allows even relatively small-diameter or slim preforms to be sucked through the mold passage. Since no cold ambient air will be leaking in from outside as a result of the suction applied to the outlet end of the passage, the preform will not be locally cooled so that it will remain plastic and will be easily deformed to the desired shape.

According to the invention the seal is fixed to the one face. More particularly the one face is formed with a groove holding the seal. This groove can be undercut, typically being of isosceles-trapezoidal section.

To further facilitate the manufacture of slim and/or complexly shaped workpieces means is provided for introducing heated gas into the intake end around the preform. A controller maintains a temperature of the heated gas generally constant.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
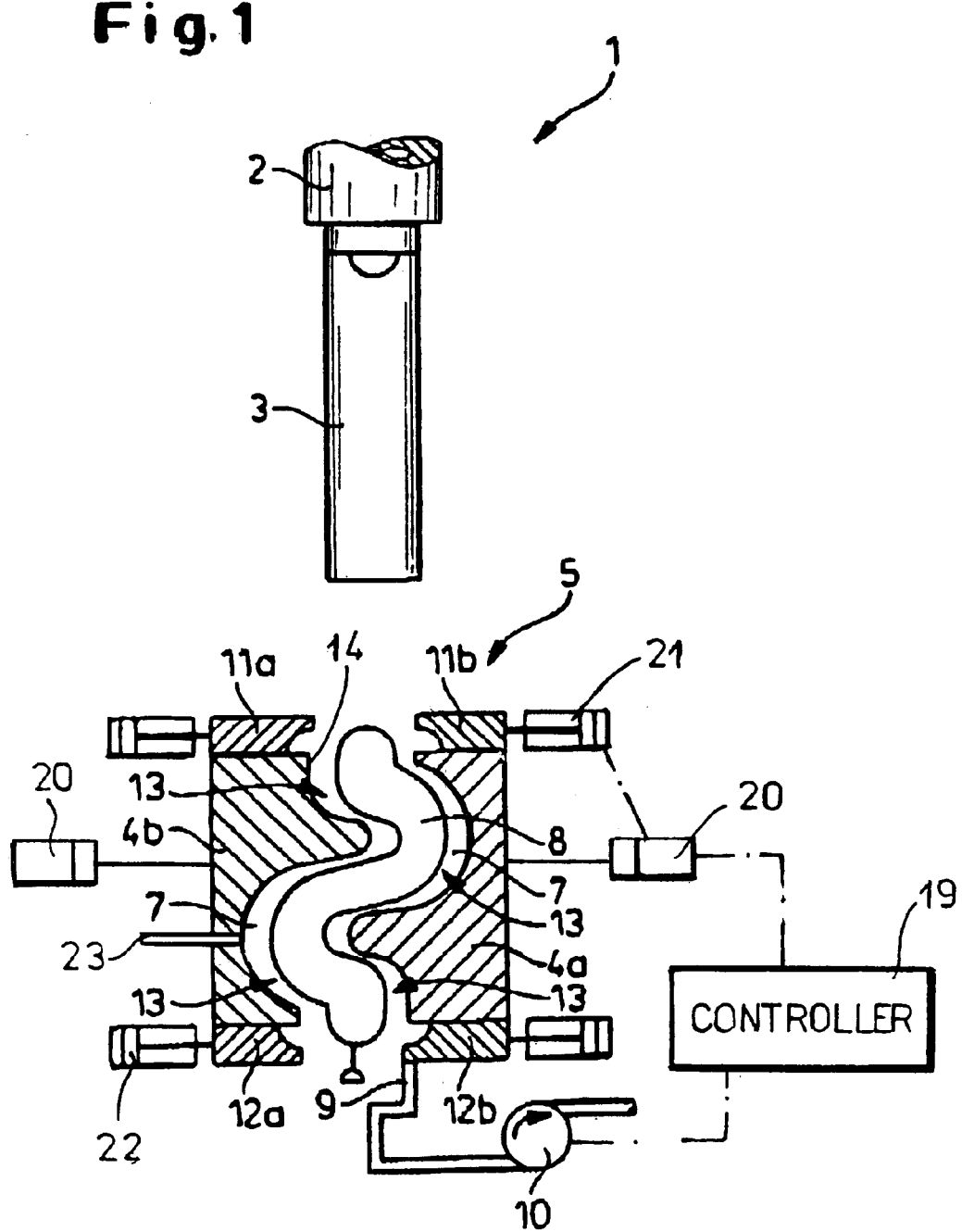
FIG. 1 is a small-scale and partly diagrammatic side view of a system according to the invention.

As seen in FIG. 1 a extruder system 1 has a head 2 that produces a preform 3 moved by an unillustrated handler or manipulator toward and away from a mold 5 having a pair of female mold halves 4a and 4b forming a nonstraight passage 7 having an upper intake end and a lower output end. At the start of a mold cycle the two mold halves 4a and 4b are closed together by hydraulic actuators 20 and suction is applied by a suction conduit 9 from a pump 10 to the outlet end of the passage cavity 7 to suck the preform 3 down through it, as the preform 3 is being extruded from the nozzle 2 and/or advanced by the manipulator. The suction from the pump 10 causes air flow along the passage 7 in a space 13 surrounding the preform 3.

According to the invention a seal 14 is provided between the faces of the mold halves 4a and 4b. This is normally an elastomeric seal strip fixed to one of the mold-half faces and compressed, when the mold 5 is closed, against the other face. It prevents any leakage of air into the mold cavity.

Once a leading end of the preform 3 is at a lower end of the cavity 7, upper pinchers 11a and 11b and lower pinchers 12a and 12b are closed by actuators 21 and 22 to pinch off the trailing and leading ends of the preform 3. During this threading of the preform through the passage 7 the seal 14 prevents any aspiration of cold outside air into the passage 7 between faces of the mold halves 4a and 4b.

Then a needle 23 is poked into a central region of the preform 3 to inflate it to a finished workpiece 8 that is cured in the mold 5. Thereafter the mold 5 is opened, the pinchers 11a, 11b, 12a, and 12b are released, and the finished workpiece 8 is removed from the open mold. A common computer-type controller 19 operates the actuators 20,21, and 22 as well as the extruder system 1 and the suction pump 10.

Figure 2:
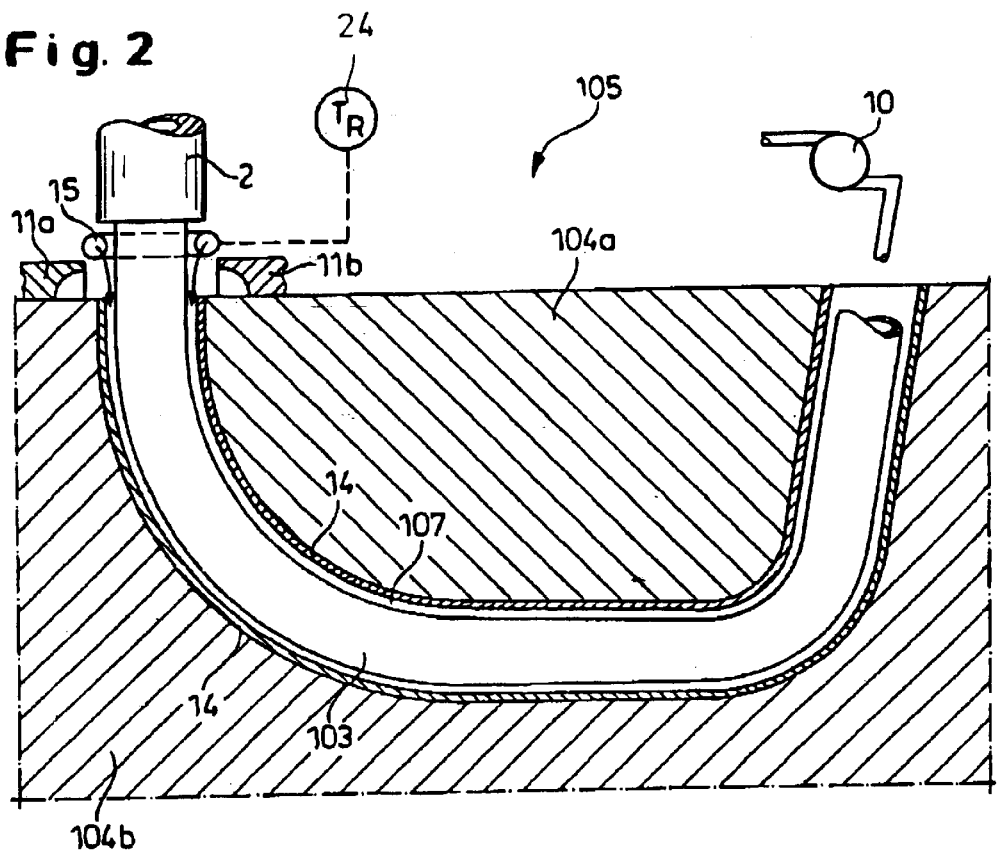
FIG. 2 is a larger-scale section through a mold in accordance with the invention.

FIG. 2 shows another system with a mold 105 formed by a pair of mold halves of which only one half 104a is shown. A mold cavity 107 holding a parison has intake and outlet ends that both open upward. In addition a heater/blower collar 15 is provided between the extruder head 2 and the intake end of the cavity 107 holding the parison 103.

Once again, according to the invention the face of the mold half 104a that engages the other unillustrated mold half is provided along the edge of the cavity with the elastomeric seal strip 14 that projects slightly past the mold face so as to firmly engage the other mold face when the mold 105 is closed. This ensures that the pump 10 will draw air along the passage 107, not between the mold-half faces and laterally into the passage 107.

The blower/heater 15 is operated by a temperature regulator 25 so that it feeds an annular stream of temperature-controlled air into the upstream end of the passage 107 around the parison 103. Since the seals 14 effectively prevent any leakage laterally into the passage 107, this hot air will ensure that the parison 103 remains pliable as it is sucked first down and then up through the passage 107.

Figure 3A:
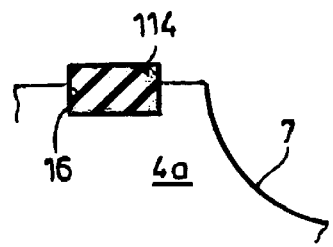
FIGS. 3a, 3b, 3c, and 3d are large-scale sections illustrating details of the current invention.
Figure 3B:
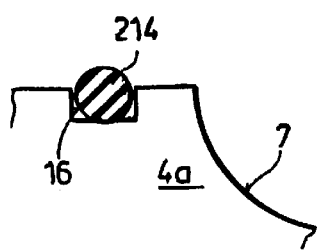
Figure 3C:
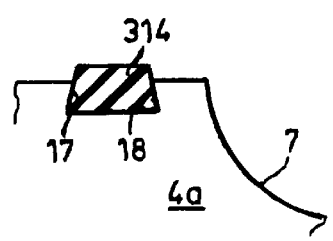
Figure 3D:
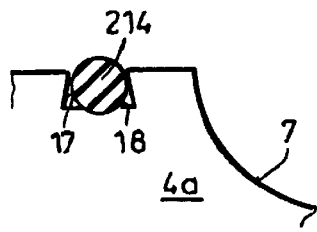

FIG. 3a shows how a mold half 4a is formed adjacent the passage 7 with a rectangular-section groove 16 in which is set a complementary rectangular-section seal 114. Alternately as shown in FIG. 3b, a round-section seal 214 can be used. In FIG. 3c there is a trapezoidal groove 18 with undercut flanks 17 that are inclined outward toward each other and that hold a complementarily shaped seal 314. In FIG. 3d the same shape as in FIG. 3c is used, but with the round-section seal 214. In all cases it is possible to provide an adhesive in the groove to hold the seal in place, and in all cases the seal projects past the normally planar face of the respective mold half so as to be sure to engage the other mold-half face when the mold is closed.

We claim:

1. A molding apparatus comprising:
   a pair of mold halves having faces engageable together to form a nonstraight passage having an intake end and an output end;
   extruder means for forming a hollow plastic preform and feeding it to the intake end of the passage;
   pump means connected to the output end of the passage for drawing gas therefrom and thereby applying drawing the preform through the passage; and
   means including a seal carried on one of the faces, extending along the passage, and engaging the other of the faces for preventing gas flow between the faces into the passage when the mold halves are closed together.

2. The molding apparatus defined in claim 1 wherein the seal is fixed to the one face.

3. The molding apparatus defined in claim 2 wherein the one face is formed with a groove holding the seal.

4. The molding apparatus defined in claim 3 wherein the groove is undercut.

5. The molding apparatus defined in claim 1, further comprising means for introducing heated gas into the intake end around the preform.

6. The molding apparatus defined in claim 5, further comprising control means for maintaining a temperature of the heated gas generally constant.

7. The molding apparatus defined in claim 1 wherein the passage is nonstraight and the seal runs along an edge of the passage.

* * * * *